United States Patent
Stephens et al.

(10) Patent No.: US 10,084,537 B2
(45) Date of Patent: Sep. 25, 2018

(54) METHOD AND APPARATUS FOR SYNCHRONIZATION

(71) Applicant: NOKIA SOLUTIONS AND NETWORKS OY, Espoo (FI)

(72) Inventors: Robert Stephens, Bartlett, IL (US); Roy Yang, Buffalo Grove, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/407,821

(22) Filed: Jan. 17, 2017

(65) Prior Publication Data

US 2018/0205452 A1    Jul. 19, 2018

(51) Int. Cl.
*H04L 7/02*    (2006.01)
*H04B 7/26*    (2006.01)
*H04B 7/06*    (2006.01)
*H04L 5/00*    (2006.01)

(52) U.S. Cl.
CPC ......... *H04B 7/2684* (2013.01); *H04B 7/0632* (2013.01); *H04L 5/0048* (2013.01)

(58) Field of Classification Search
CPC ..... H04L 7/033; H04L 7/027; H04L 25/4904; H04W 16/32; H04W 72/06
USPC ......... 375/359, 355, 356, 368; 370/252, 331
See application file for complete search history.

(56) References Cited

U.S. PATENT DOCUMENTS

| 2017/0064675 A1* | 3/2017 | Kim ....................... H04B 7/068 |
| 2017/0237535 A1* | 8/2017 | Park ....................... H04L 5/0035 |
| | | 370/329 |
| 2017/0238195 A1* | 8/2017 | Hao ....................... H04W 16/32 |
| | | 370/328 |
| 2017/0238323 A1* | 8/2017 | Marinier ............... H04W 72/06 |
| | | 370/329 |

OTHER PUBLICATIONS

Geoffrey M. Garner; IEEE 1588 Version 2; ISPCS Ann Arbor'08 (International Symposium on Precision Clock Synchronization); Sep. 24, 2008; 89 pages.

* cited by examiner

*Primary Examiner* — Khai Tran
(74) *Attorney, Agent, or Firm* — Squire Patton Boggs (US) LLP (57) ABSTRACT

Achieving phase synchronization in single frequency networks may be useful in various communication systems. For example, the use of synchronous Ethernet, timing over packet, and radio interface based synchronization (RIBS) may be applied in mobile and/or data communication networks. Certain embodiments improve phase accuracy using a hybrid synchronization method beyond standard RIBS and clustering carriers using the same transmission waveforms across carriers. Certain embodiments also select a master transmission point to maximize the signal quality of the composite waveforms in a cluster.

20 Claims, 8 Drawing Sheets

METHOD AND APPARATUS FOR SYNCHRONIZATION

BACKGROUND

Field

Achieving phase synchronization in single frequency networks may be useful in various communication systems. For example, synchronous Ethernet, timing over packet, and radio interface based synchronization may be applied in mobile and/or data communication networks.

Description of the Related Art

Single frequency network (SFN) technology has emerged as a cost-effective alternative to distributed antenna systems (DAS) for providing wireless communication services. One of the main advantages of using DAS is that the network operator may use as many distributed remote antenna elements as necessary to optimize radio frequency (RF) coverage using a single RF transmitter. The phase relationships at distributed remote antenna elements are determined by the length of cable between the antennas and the RF transmitter.

In contrast, a SFN offers the ability to place transceivers in locations similar to the DAS antenna elements by using fiber optic cables and commercial packet switching interfaces to one or more transmission points (TPs) in the SFN, eliminating the need for costly and expensive RF cables to the DAS antenna elements. IEEE 1588 packets may be sent to TPs via a commercial, off-the-shelf Ethernet interface. Furthermore, the SFN offers a network operator flexibility when switching between the SFN network and conventional small cell network to address capacity needs without requiring equipment upgrades.

A SFN may include multiple TPs, with one or more TPs contained in the SFN operating with the same frequency when transmitting radio wave signals. While operating inside a SFN, user equipment (UE) will receive a composite of the wave signals transmitted by multiple TPs that are part of the SFN. However, in order to achieve optimal performance, a cluster of TPs may be phase synchronized in the SFN.

Current technology provides phase synchronization with timing over packet (TOP). In TOP, one or more TPs in the SFN receive an IEEE 1588 precision time protocol (PTP) packet periodically. For example, 32 IEEE 1588 packets may be sent each second from a grand master clock to assist the TP in adjusting its phase. Upon one or more TPs in the SFN acquiring synchronization status using the PTP packets, the SFN becomes synchronized and may begin service.

In one existing variation, the PTP packets are initially sent to a device, such as a central control unit (CCU). The device then sends IEEE 1588-2008 packets to one or more TPs periodically. However, one example of a drawback with this technique is the existence of significant variance in the TP phase stability during phase synchronization due to inconsistencies between IEEE-1588 messaging rates, Quality of Service (QoS) configurations, network traffic, and variations in the local oscillators between and/or among individual TPs.

In another existing variation, the above mentioned variation is further modified by utilizing a synchronized Ethernet (SyncE) to enable frequency synchronization. The initial phase of one or more TPs is established when the SyncE is enabled, as well as the relative phase relationships between one or more TPs. Thus, the phase of one or more TPs requires only one change when the SyncE is enabled. However, this technique has drawbacks as well. For example, large variations in phase between TPs may occur despite achieving synchronization due to TOP inaccuracies. The spatial relationship in the composite downlink waveform is distorted, resulting in deteriorated downlink performance.

In some of the above techniques, PTP packets are sent to all TPs, and one or more TPs may synchronize individually with the source of the PTP packets. Both of the techniques suffer from performance degradation due to a large phase variance between TPs caused by time/phase resolution of the PTP packets, as well as variations in the oscillator performance within individual TPs during phase acquisition. Thus, there exists a need for an efficient method of optimizing phase synchronization for TPs, for example, in a SFN during the initialization of the SFN.

When using a combination of SFN-based and DAS-based network technology, the phase relationship between TPs in the SFN may be as close as possible to the phase relationship of the TPs in a DAS. In a DAS, the phase relationship between antenna elements may contribute to any phase errors that occur due to differences in amplifiers and cable lengths. Similarly, phase differences in a SFN may result from synchronization inaccuracies between the TP and the grand master clock.

SUMMARY

According to an embodiment, an apparatus can include at least one processor, and at least one memory including computer program code. The at least one memory and the computer program code are configured to, with the at least one processor, cause the apparatus to at least receive, by a device, one or more indications from one or more transmission points of a plurality of transmission points within a single frequency network. The received indications comprise one or both of one or more quality metrics and data from which to derive one or more quality metrics. The at least one memory and the computer program code are further configured to, with the at least one processor, cause the apparatus to at least select, by the device, a transmission point from the plurality of transmission points based upon one or more quality metrics. The at least one memory and the computer program code are further configured to, with the at least one processor, cause the apparatus to at least form, by the device, a cluster, wherein the cluster includes the selected transmission point and at least one other transmission point from the plurality of transmission points. The at least one memory and the computer program code are further configured to, with the at least one processor, cause the apparatus to at least communicate, by the device, an indication of the cluster to one or more of the selected transmission point and at least one other transmission point in the cluster. The indication of the cluster comprises at least information about the selected transmission point and at least one other transmission point from the plurality of transmission points.

According to an embodiment, an apparatus can include at least one processor, and at least one memory including computer program code. The at least one memory and the computer program code are configured to, with the at least one processor, cause the apparatus to at least transmit, by a transmission point of a plurality of transmission points within a single frequency network, an in-band radio frequency reference signal to one or more other transmission points of the plurality of transmission points. The at least one memory and the computer program code are further configured to, with the at least one processor, cause the apparatus to receive, by the transmission point, an indication that the transmission point has been selected as a master transmission point, wherein the selection of the master transmission point is based on one or more quality metrics. The at least one memory and the computer program code are further configured to, with the at least one processor, cause the apparatus to receive, by the transmission point, an indication that the transmission point and one or more other transmission points of the plurality of transmission points are included in a cluster.

According to an embodiment, an apparatus can include at least one processor and at least one memory including computer program code. The at least one memory and the computer program code are configured to, with the at least one processor, cause the apparatus to at least receive, by a transmission point, one or more in-band radio frequency reference signals. The at least one memory and the computer program code are further configured to, with the at least one processor, cause the apparatus to transmit, by the transmission point, data of the one or more in-band radio frequency reference signals. The at least one memory and the computer program code are further configured to, with the at least one processor, cause the apparatus to receive, by the transmission point, one or more indications of a cluster including information of the transmission point and at least one other transmission point in a plurality of transmission points within a single frequency network. The selection of a master transmission point may be based on a quality metric. The cluster may be formed based upon quality metrics derived from one or more indications received from one or more indications transmitted by the one or more transmission points.

A non-transitory computer readable medium can, in certain embodiments, be encoded with instructions that, when executed in hardware, perform a process. The process can include a method according to any of the steps performed by any of the above discussed apparatuses.

A computer program product can, according to certain embodiments, encode instructions for performing a process. The process can include a method according to any of the steps performed by any of the above discussed apparatuses.

According to an embodiment, an apparatus can include means for receiving, by a device, one or more indications from one or more transmission points of a plurality of transmission points within a single frequency network. The received indications comprise one or both of one or more quality metrics and data from which to derive one or more quality metrics. The apparatus can further include means for selecting, by the device, a transmission point from the plurality of transmission points based upon one or more quality metrics. The one or more quality metrics may be derived from one or more of the received one or more indications. The apparatus can further include means for forming, by the device, a cluster, wherein the cluster includes the selected transmission point and at least one other transmission point from the plurality of transmission points. The apparatus can further include means for communicating, by the device, an indication of the cluster to one or more of the selected transmission point and at least one other transmission point in the cluster. The indication of the cluster comprises at least information about the selected transmission point and at least one other transmission point from the plurality of transmission points.

According to an embodiment, an apparatus can include means for transmitting, by a transmission point of a plurality of transmission points within a single frequency network, an in-band radio frequency reference signal to one or more other transmission points of the plurality of transmission points. The apparatus can further include means for receiving, by the transmission point, one or more indications that the transmission point has been selected as a master transmission point, wherein the selection of the master transmission point is based on one or more quality metrics. The apparatus can further include means for receiving, by the transmission point, one or more indications that the transmission point and one or more other transmission points of the plurality of transmission points are included in a cluster.

According to an embodiment, an apparatus can include means for receiving, by a transmission point, one or more in-band radio frequency reference signals. The apparatus can further include means for transmitting, by the transmission point, data of the one or more in-band radio frequency reference signals. The apparatus can further include means for receiving, by the transmission point, one or more indications of a cluster including information of the transmission point and at least one other transmission point in a plurality of transmission points within a single frequency network.

BRIEF DESCRIPTION OF THE DRAWINGS

For proper understanding of this disclosure, reference should be made to the accompanying drawings, wherein.

DETAILED DESCRIPTION

Certain embodiments ensure that the SFN phase accuracy is as close as possible to the DAS phase accuracy by minimizing the phase differences between the TPs in a SFN. Furthermore, certain embodiments minimize the number of TPs required to be connected to the device to achieve network synchronization.

Certain embodiments provide a hybrid mechanism for achieving phase synchronization within a SFN. Using a combination of TOP and radio interface based synchronization (RIBS) provides a novel method of generating constructive RF carrier interference between carriers that use the same transmission waveforms.

A SFN may include multiple TPs that may simultaneously broadcast the same communication signal using at least partially the same carrier frequency. Synchronous Ethernet (SyncE) enables synchronization of network devices, and is incorporated herein in its entirety. The ITU Telecommunication Standardization Sector (ITU-T) has established SyncE as a standard for transmitting clock data between network devices, and is incorporated herein in its entirety.

Figure 1:
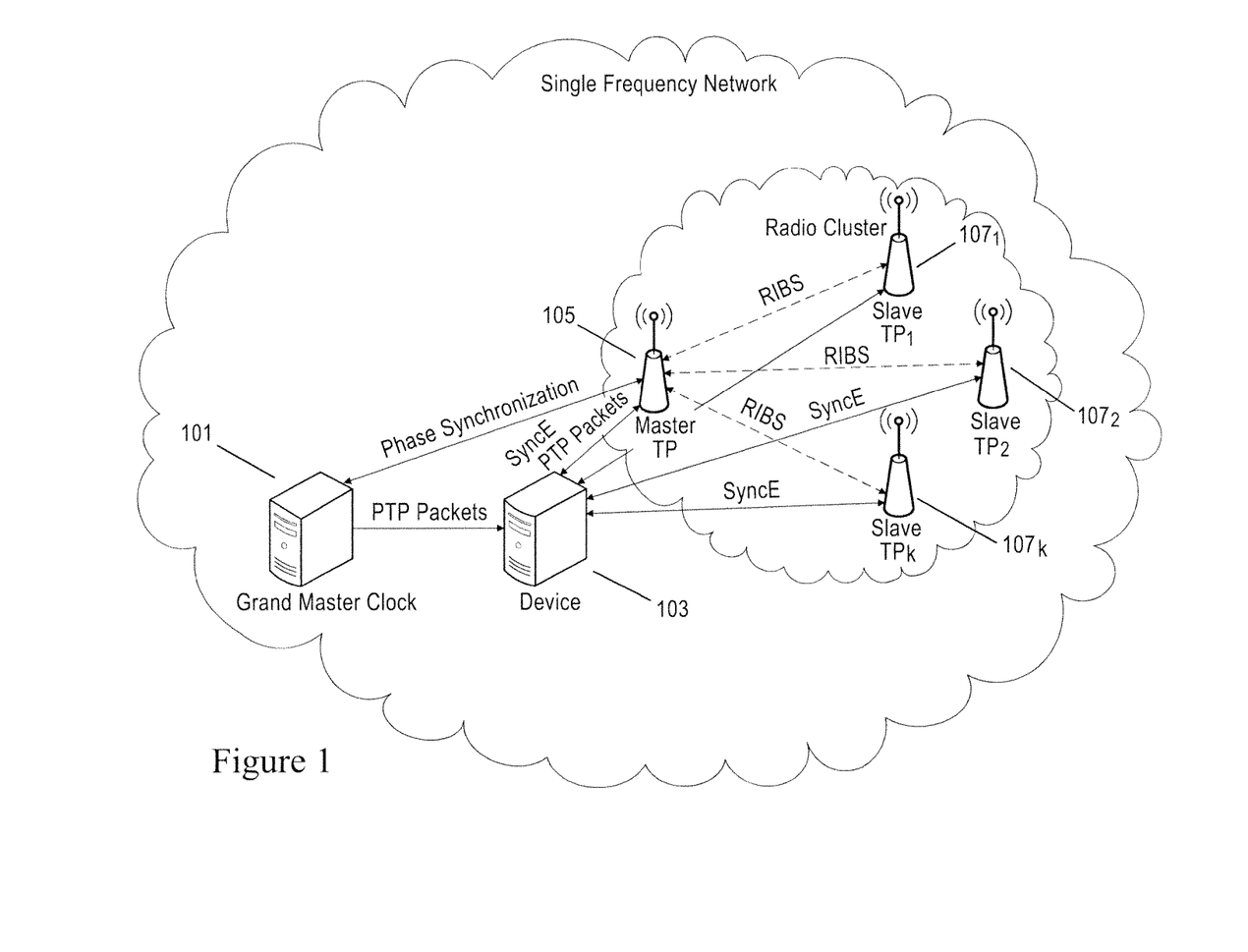
FIG. 1 illustrates a system according to certain embodiments.

FIG. 1 illustrates a system according to certain embodiments. A single frequency network may include at least one or more of a grand master clock (GMC) 101, a device 103, such as a central control unit (CCU), a master transmission point 105, and/or one or more slave transmission points $107_1$ through $107_k$, where k is the maximum number of transmission points in a given embodiment.

GMC 101 may be in communication with device 103 and master transmission point 105. GMC 101 may send IEEE 1588 Precision Timing Protocol (PTP) packets one or more of device 103, master transmission point 105, and slave transmission points $107_1$ through $107_k$. IEEE 1588 is hereby incorporated by reference in its entirety. GMC 101 may also achieve phase synchronization with master transmission point 105.

Device 103 may be in communication with master transmission point 105 and one or more slave transmission points $107_1$ through $107_k$ via a synchronized Ethernet connection. Device 103 may also send PTP packets to master transmission point 105. Master transmission point 105 may be in further communication with one or more of one or more slave transmission points $107_1$ through $107_k$ via RIBS. One or more slave transmission points $107_1$ through $107_k$ may further be a part of a cluster. In certain embodiments, the cluster may be a radio cluster.

Figure 2:
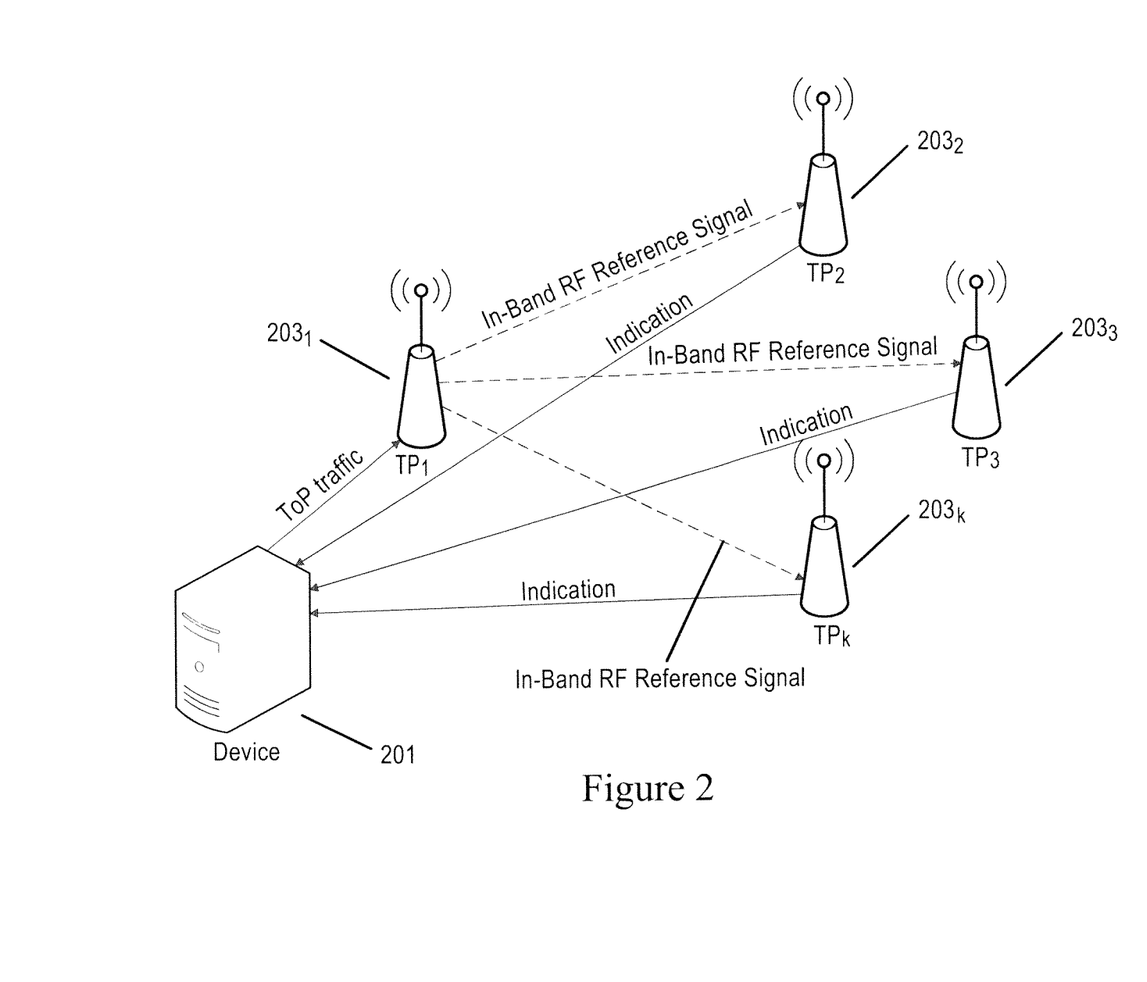
FIG. 2 illustrates another system according to certain embodiments.
Figure 4:
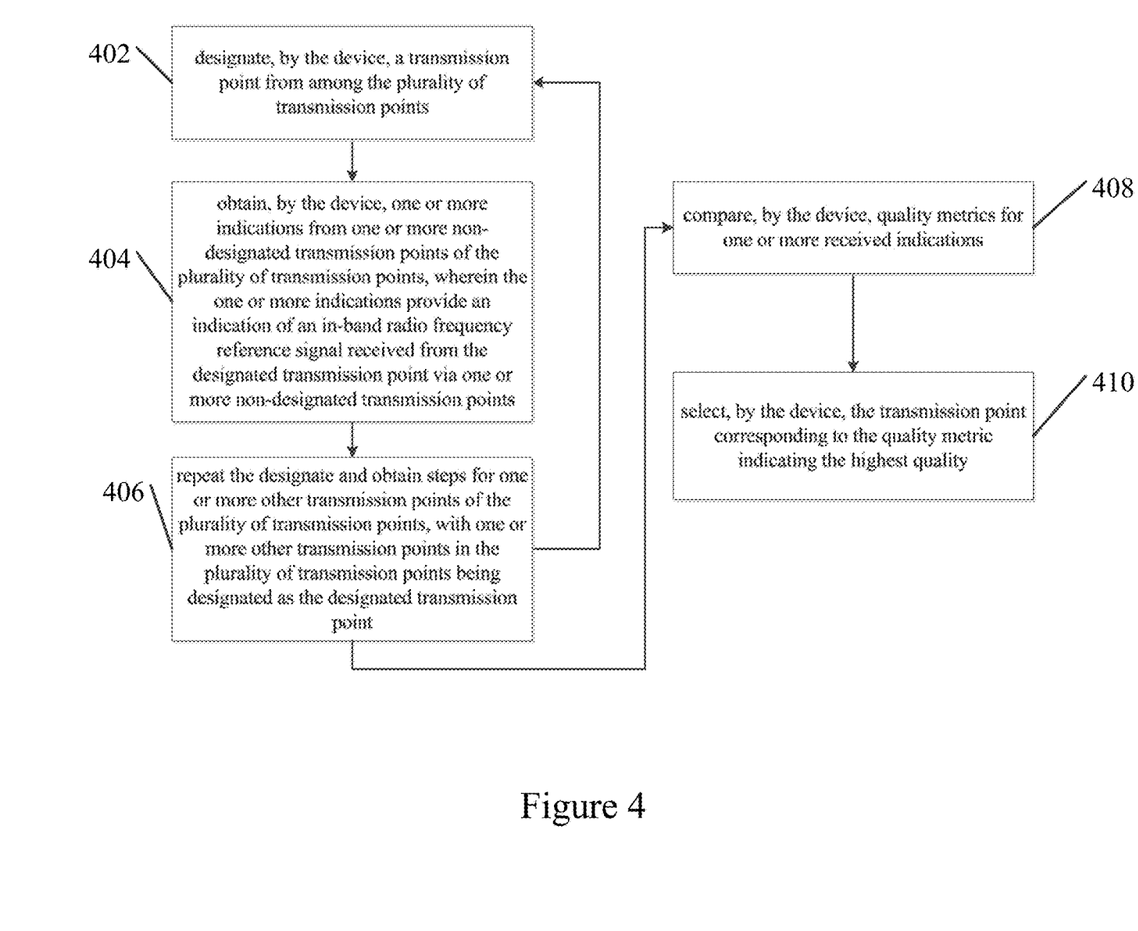
FIG. 4 illustrates another method performed by a device according to certain embodiments.

FIG. 2 illustrates a system according to certain embodiments. In particular, FIG. 2 illustrates the selection of a master transmission point from among TPs $203_1$ through $203_k$. Device 201 is in communication with TPs $203_1$ through $203_k$. Device 201 may select one TP from among TPs $203_1$ through $203_k$, as shown in the embodiment of FIG. 4. The selected TP may send one or more in-band RF reference signals to the non-selected TPs, and the non-selected TPs may receive the one or more transmissions of the in-band RF reference signal from the selected TP.

The non-selected TPs may send one or more indications of the in-band RF reference signal to device 201. The one or more indications of the signal may include any combination of one or more of indications of signal power, signal to interference and noise ratio (SINR), path loss, channel rank, and/or any other metrics that reflect the quality of the signal. An indication of the signal may be in the form of data, values, measurements, estimations, numbers, analysis, assessments, evaluations, quantifications, and/or information.

Device 201 may receive the one or more indications of the in-band RF reference signal from one or more of the one or more non-selected TPs. Device 201 may establish metrics for one or more of the non-selected TPs based on the respective received one or more indications of the in-band RF reference signal. The established metrics may include a combination of one or more of indications of signal power, signal to interference and noise ratio (SINR), path loss, channel rank, or any other values that reflect the quality of the signal in a metric. An indication of the signal may be in the form of data, values, measurements, estimations, numbers, analysis, assessments, evaluations, quantifications, and/or information.

Device 201 may repeat the process described above for one or more TPs from among TPs $203_1$ through $203_k$. One or more TPs transmit one or more in-band RF reference signals to one or more of the one or more remaining TPs for respective measurement of the metrics. The one or more remaining TPs may act as an over-the-air signal source, allowing the one or more of the remaining TPs to generate its own measurement profile of the signal source TP. The remaining one or more TPs transmit one or more indications of the received in-band RF reference signal, for example, the measurement profile of the signal source, to device 201. In an embodiment, the indications of the received in-band RF reference signal may include one or more indications of signal quality in the form of a quality metric. In an embodiment, device 201 may establish one or more metrics based upon the one or more indications of the in-band RF reference signal. For example, the device may analyze and compare the measurement profiles received from the one or more remaining TPs, and may analyze and determine the radio interface relationship between a pair of TPs.

Based upon the received quality metrics and/or established quality metrics, the device may select the TP corresponding to a combination of one or more of indications of signal power, signal to interference and noise ratio (SINR), path loss, channel rank, or any other values that reflect the quality of the signal in the one or more metrics, and set this TP as a master TP. An indication of the signal may be in the form of of data, values, measurements, estimations, numbers, analysis, assessments, evaluations, quantifications, and/or information. The selection of the master TP may be based upon the indications from the non-selected TPs indicating that the collective reported signal quality is the highest or strongest, where the TP would provide the highest collective signal quality as the master TP when compared to the other TPs. In one example, in a line-of-sight environment where one or more TPs in a group of TPs can send and receive signals from one or more other TPs, the TP in the geographical center of the group of TPs may be selected as the master TP because the TP in the geographical center provides the highest collective signal quality for the TPs in the group. In one embodiment, the group of TPs form a cluster.

For example, device 201 may set $203_k$ as the master transmission point because $203_k$ has the strongest or highest signal power metric. In another example, device 201 may set $203_k$ as the master transmission point because $203_k$ has the lowest or weakest path loss metric.

In another example, device 201 may determine that the quality metric of one or more TPs in a group is too low or weak to be selected as the master TP. In this case, device 201 may form a new cluster containing one or more TPs based on the quality metrics for the TPs in the new cluster.

Once device 201 has selected a TP as the master transmission point, device 201 may send TOP traffic to the master transmission point.

Figure 3:
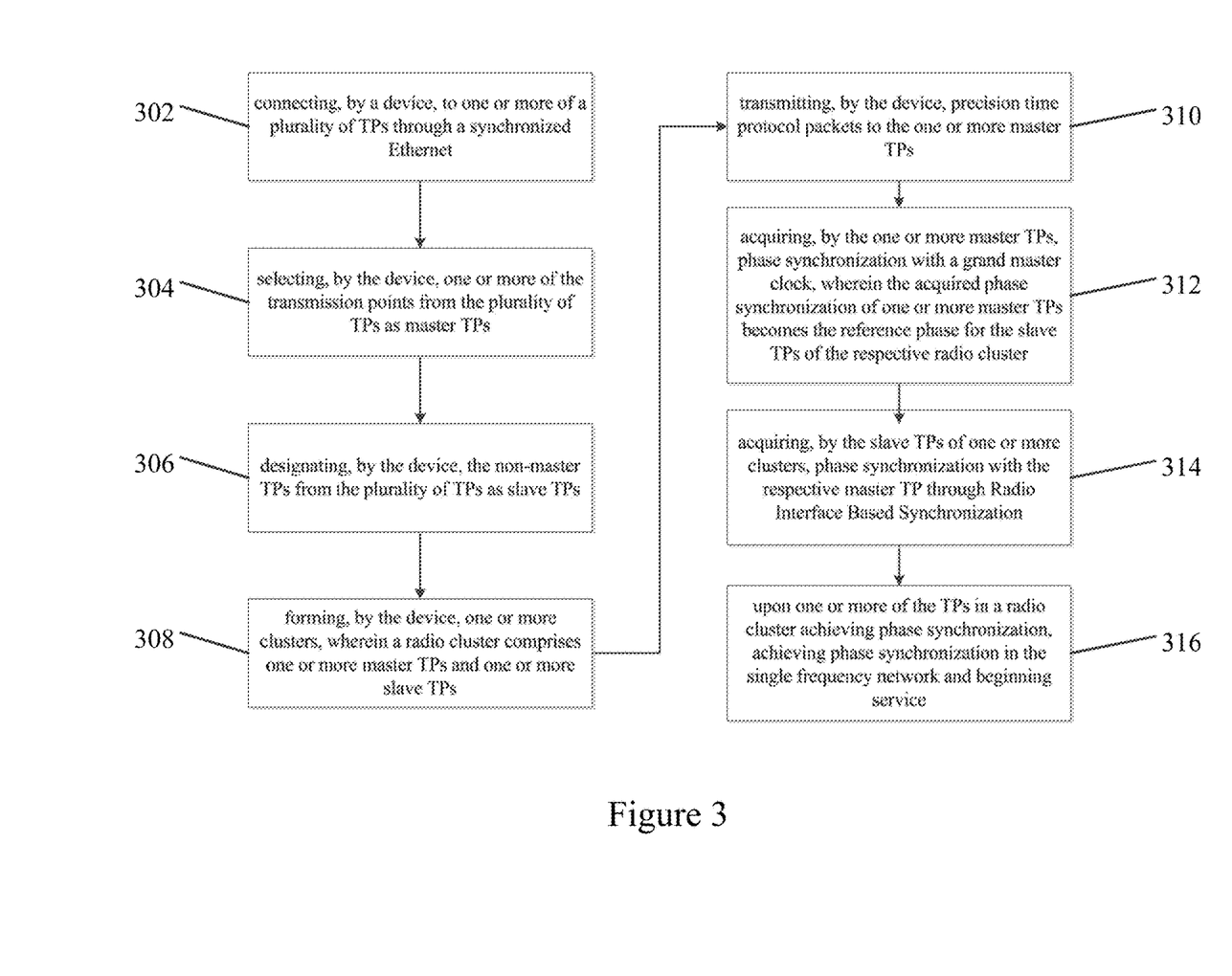
FIG. 3 illustrates a method performed by a device according to certain embodiments.

FIG. 3 illustrates a method according to certain embodiments. In particular, FIG. 3 illustrates an embodiment of the device.

In step 302, a device connects to one or more of a plurality of TPs through a synchronized Ethernet. The device may select one or more of the transmission points from the plurality of TPs as master TPs, as shown in step 304. In step 306, the device may designate the TPs not selected as master TPs in step 304 as slave TPs. In step 308, the device may form a cluster. In certain embodiments, a cluster may include one or more of a master TP and one or more slave TPs. In certain embodiments, the cluster may be a radio cluster. In certain embodiments, the device may communicate an indication of the cluster to one or more of the master transmission points and at least one other transmission point in the cluster. In certain embodiments, the indication of the cluster may comprise information about one or more of the master transmission points, at least one other transmission point in the cluster, at least one transmission point receiving the indication of the cluster, and/or at least one other transmission point in the plurality of transmission points. In step 310, the device may transmit PTP packets to the one or more master TPs. In step 312, the one or more master TPs may acquire phase synchronization with a GMC. The acquired phase synchronization of one or more of the master TPs may become the reference phase for the slave TPs of the respective cluster. In step 314, the slave TPs of a cluster may acquire phase synchronization with the respective master TP through RIBS. In step 316, upon one or more of the TPs in a cluster achieving phase synchronization, one or more of the device, the master TP, and one or more slave TPs may achieve phase synchronization in the single frequency network and begin service.

FIG. 4 illustrates a method according to certain embodiments. In particular, FIG. 4 illustrates an embodiment of the device.

In step 402, a device may designate or select a TP from among a plurality of TPs. In step 404, the device may obtain or receive one or more indications from one or more non-designated transmission points of the plurality of transmission points, wherein the one or more indications provide an indication of an in-band radio frequency reference signal received from the designated transmission point via one or more non-designated transmission points. The received indications may comprise one or more of one or more quality metrics and data from which to derive one or more quality metrics. For example, the data from which to derive one or more quality metrics may include raw signal data.

In step 406, the device may repeat the designate or select step 402, and obtain or receive step 404, for one or more other transmission points of the plurality of transmission points, with one or more other transmission points in the plurality of transmission points being designated as the designated transmission point. For example, the device may first designate TP-1, leaving TP-2 and TP-3 as undesignated. The device may then establish quality metrics for one or more received one or more indications of in-band RF reference signals from TP-2 and TP-3. Then, the device may designate TP-2, leaving TP-1 and TP-3 as undesignated. The device may then establish one or more quality metrics for one or more received indications of in-band RF reference signals from TP-1 and TP-3. The device may then designate TP-3, leaving TP-1 and TP-2 as undesignated. The device may then establish one or more quality metrics for one or more received one or more indications of in-band radio frequency reference signals from TP-1 and TP-2.

In step 408, the device may compare quality metrics from one or more received indications. One or more quality metrics may be the highest quality. In step 410, the device may select the TP corresponding with the quality metric indicating the highest quality.

Figure 5:
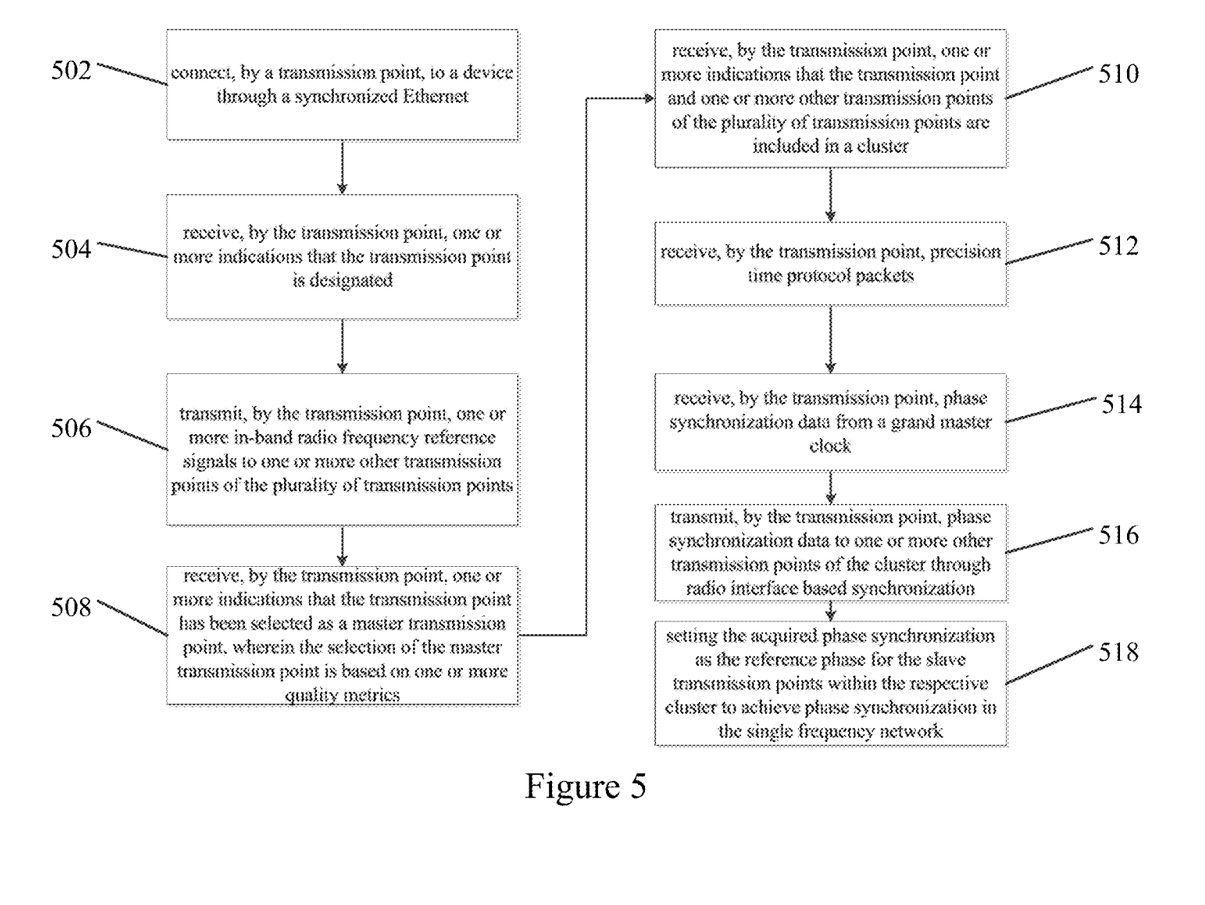
FIG. 5 illustrates a method performed by a master TP according to certain embodiments.

FIG. 5 illustrates a method for selection of a master TP according to certain embodiments.

In step 502, a transmission point may connect to a device through a synchronized Ethernet. In step 504, the transmission point may receive one or more indications that the transmission point has been designated as a designated transmission point. In step 506, the designated transmission point may transmit one or more in-band radio frequency reference signals to one or more other transmission points of the plurality of transmission points. In step 508, the designated transmission point may receive one or more indications that the transmission point has been selected as a master transmission point, wherein the selection of the master transmission point is based on one or more quality metrics. In step 510, the transmission point may receive one or more indications that the transmission point and one or more other transmission points of the plurality of transmission points are included in a cluster. The indication of the cluster may comprise information about one or more master transmission points, at least one other transmission point in the cluster, at least one transmission point receiving the indication of the cluster, and/or at least one other transmission point in the plurality of transmission points. In step 512, the transmission point may receive precision time protocol packets. In step 514, the transmission point may receive phase synchronization data from a grand master clock. In step 516, the transmission point may transmit phase synchronization data to one or more other transmission points of the cluster through radio interface based synchronization. In step 518, the transmission point may set the acquired phase synchronization as the reference phase for the slave transmission points within the respective cluster to achieve phase synchronization in the single frequency network. The phase synchronization data may cause each master transmission point to become the reference phase over the RIBS interface between the master transmission point and slave transmission points within the respective cluster, with each slave transmission point adjusting its phase through initial and/or periodic RIBS based synchronization to the master transmission point within the respective cluster.

Figure 6:
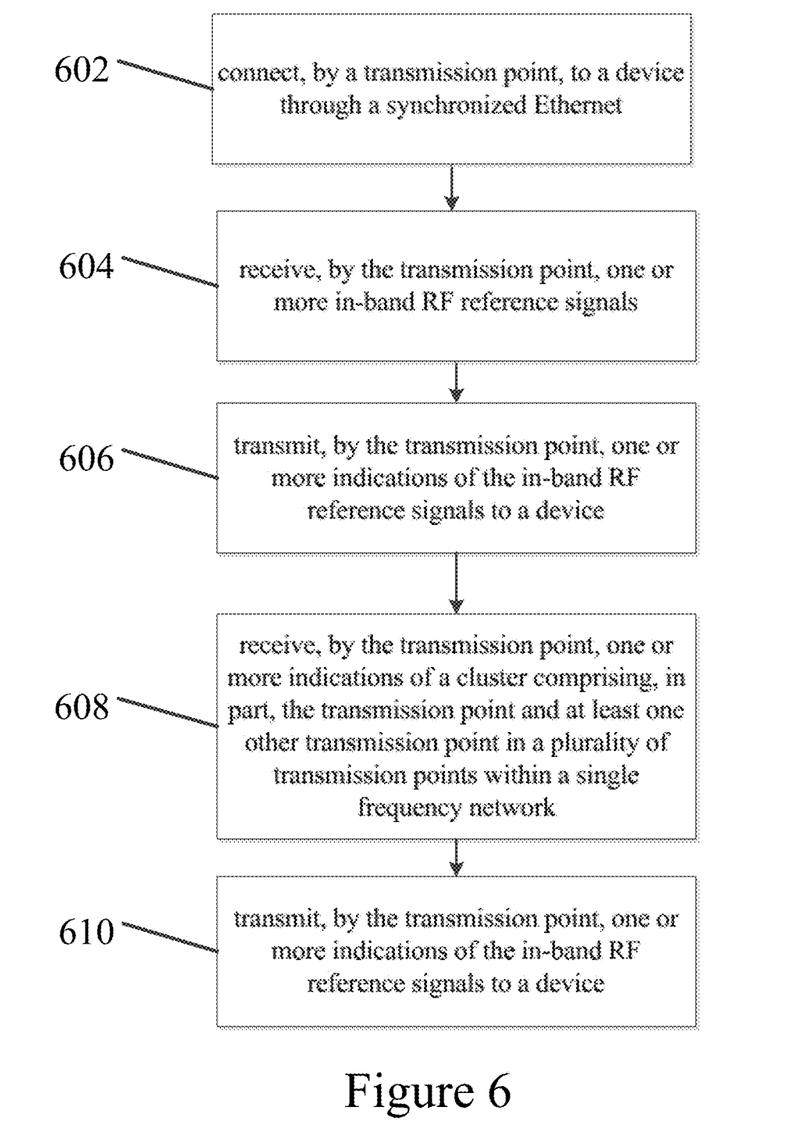
FIG. 6 illustrates a method performed by a slave TP according to certain embodiments.

FIG. 6 illustrates a method according to certain embodiments. In step 602, a transmission point may connect to a device through a synchronized Ethernet. In step 604, the transmission point may receive one or more in-band RF reference signals. In step 606, the transmission point may transmit one or more indications of the in-band RF reference signals to a device. The one or more indications of the in-band RF reference signals may include any combination of one or more of indications of signal power, signal to interference and noise ratio (SINR), path loss, channel rank, and/or any other metrics that reflect the quality of the signal. An indication of the signal may be in the form of data, values, measurements, estimations, numbers, analysis, assessments, evaluations, quantifications, and/or information. For example, the indications may include an indication of a quality metric. In step 608, the transmission point may receive one or more indications of a cluster including information of the transmission point and at least one other transmission point in a plurality of transmission points within a single frequency network. In step 610, the transmission point may transmit one or more indications of the in-band RF reference signals to a device.

Figure 7:
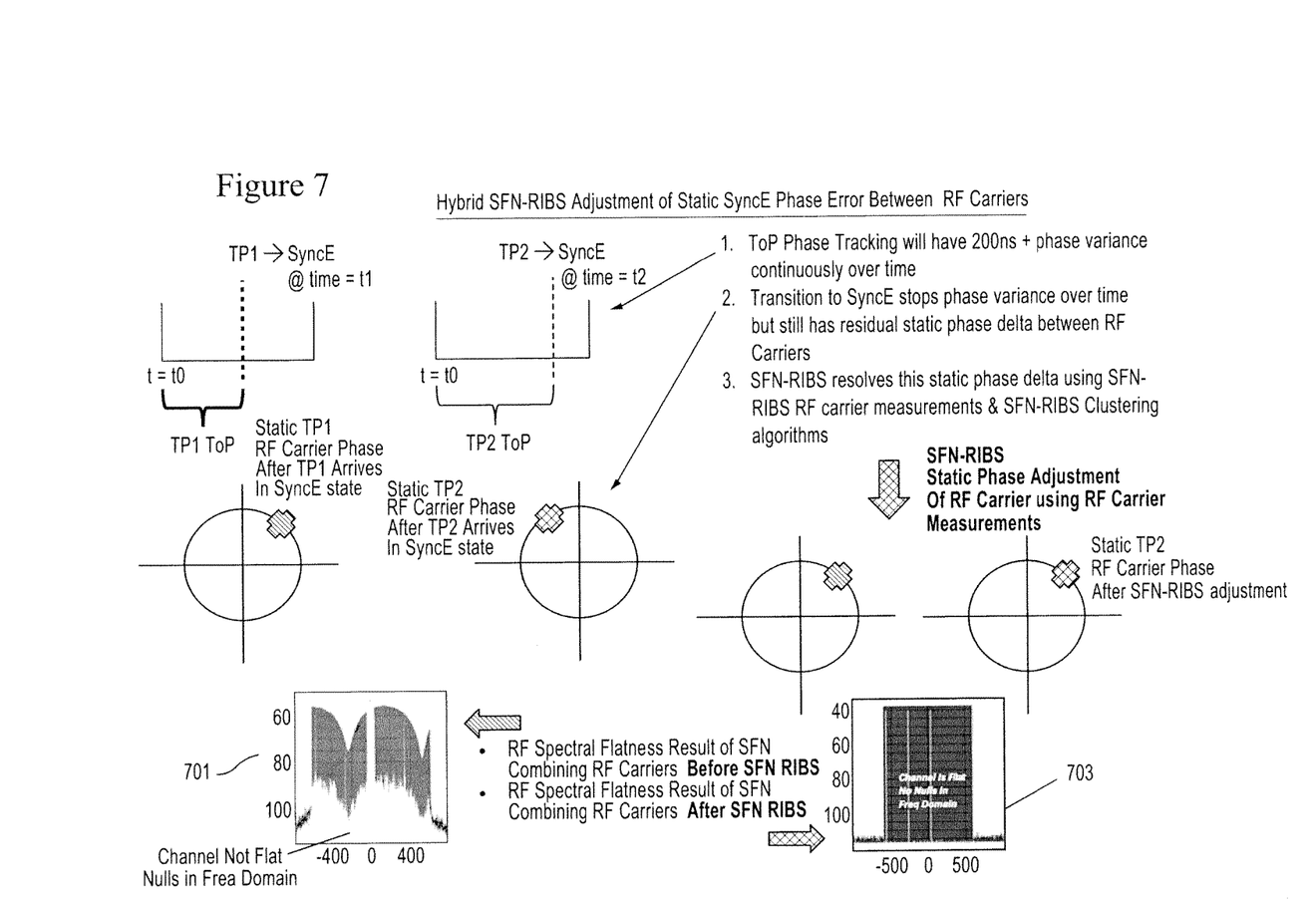
FIG. 7 illustrates a hybrid SFN-RIBS adjustment of static SyncE phase error between RF carriers.

FIG. 7 illustrates the application of SFN-RIBS to the alignment of the TP carriers after one or more TP carriers make their transition from TOP synchronization to SyncE synchronization. Before SFN-RIBS, phase variance without the SyncE state results in a channel that is not flat, as shown at 701. After the carriers arrive in the SyncE state, the ~200 ns phase variance between these carriers, which is continually varying over time, is now mapped to a static phase error, as shown at 703. SFN-RIBS uses a combination of RF carrier measurements and SFN-RIBS clustering of TPs to minimize this static phase delta between the TP carriers. The result is improved spectral flatness across the SFN transmission bandwidth and improved average throughput observed by the UE for the composite SFN transmission.

Figure 8:
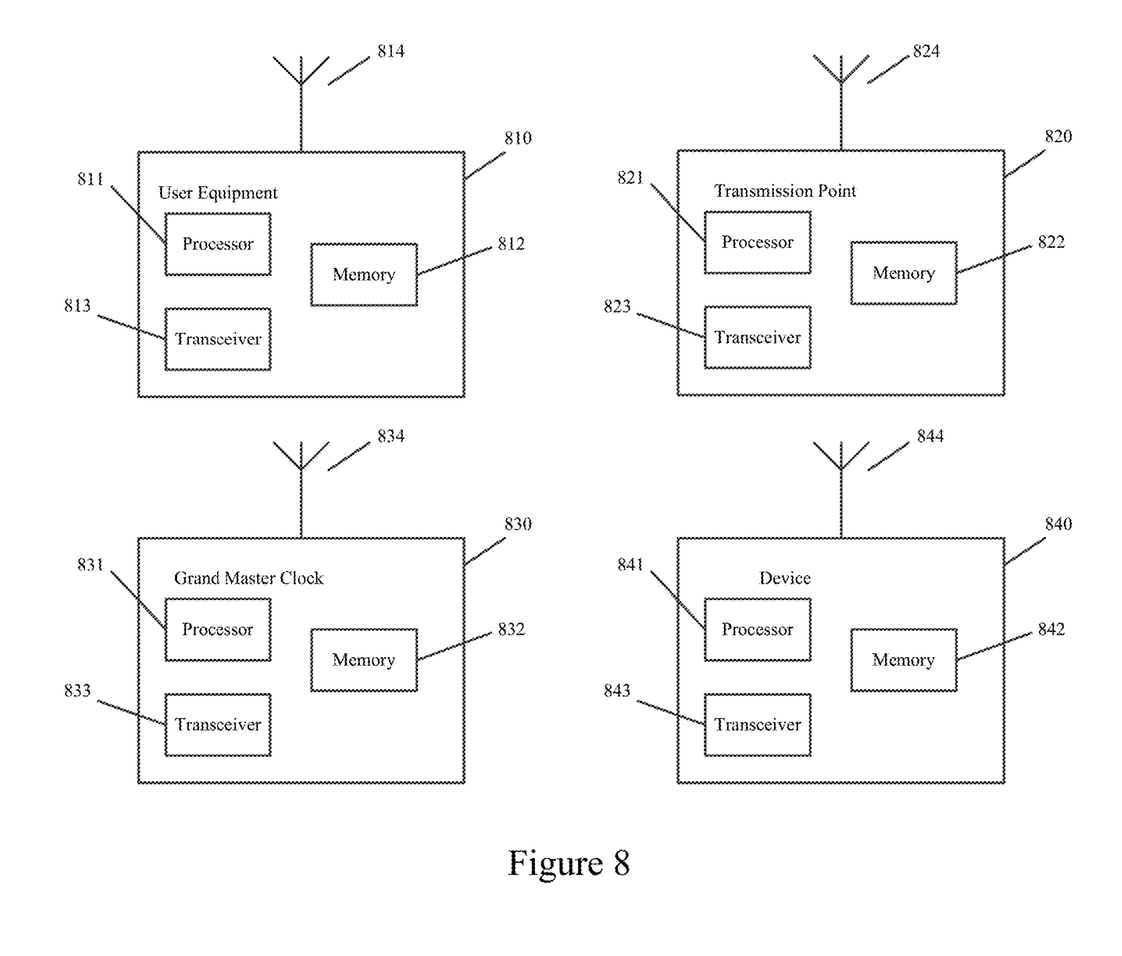
FIG. 8 illustrates a system according to certain embodiments.

FIG. 8 illustrates a system according to certain embodiments. In one embodiment, a system may include multiple devices, such as, for example, at least one UE 810, at least one TP 820 or other base station or access point, at least one GMC 830, and at least one device 840. In certain systems, UE 810, TP 820, GMC 830, device 840, and a plurality of other UE, TPs, GMCs, and devices may be present. In addition, a TP may include a mobility management entity (MME), a base station, such as an evolved Node B (eNB), a server, and/or other access node. Furthermore, device 840 may include a central control unit.

One or more of these devices may include at least one processor, respectively indicated as 811, 821, 831, and 841, respectively. At least one memory may be provided in one or more of devices indicated at 812, 822, 832, and 842, respectively. The memory may be fixed or removable. The memory may include computer program instructions or computer code contained therein. The processors 811, 821, 831, and 841 and memories 812, 822, 832, and 842, or a subset thereof, may be configured to provide means corresponding to the various blocks of FIGS. 3 through 6. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 8, transceivers 813, 823, 833, and 843 may be provided, and one or more devices may also include at least one antenna, respectively illustrated as 814, 824, 834, and 844. The device may have many antennas, such as an array of antennas configured for multiple input multiple output (MIMO) communications, or multiple antennas for multiple radio access technologies. Other configurations of these devices, for example, may be provided. For example, GMC 830 and device 840 may additionally or solely be configured for wired communication, and in such a case antennas 834 and 844 would also illustrate any form of communication hardware, without requiring a conventional antenna.

One or more transceivers 813, 823, 833, and 843 may be a transmitter, a receiver, or both a transmitter and a receiver, or a unit or device that is configured both for transmission and reception.

Processors 811, 821, 831, and 841 may be embodied by any computational or data processing device, such as a central processing unit (CPU), application specific integrated circuit (ASIC), or comparable device. The processors may be implemented as a single controller, or a plurality of controllers or processors.

Memories 812, 822, 832, and 842 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language.

The memory and the computer program instructions may be configured, with the processor for the particular device, to cause a hardware apparatus such as UE 810, TP 820, GMC 830, and device 840, to perform any of the processes described above (see, for example, FIGS. 3-6). Therefore, in certain embodiments, a non-transitory computer-readable medium may be encoded with computer instructions that, when executed in hardware, perform a process such as one of the processes described herein. Alternatively, certain embodiments may be performed entirely in hardware.

Furthermore, although FIGS. 1 and 2 illustrates a system including a UE, TP, GMC, and device, certain embodiments may be applicable to other configurations, and configurations involving additional elements.

Certain embodiments may have various benefits and/or advantages. For example, certain embodiments maximize the quality of composite carrier signals, while also minimizing the impact of composite RF carrier nulls observed by Long Term Evolution (LTE) channel estimators when used in UE devices on SFNs. Furthermore, certain embodiments may enable the ability to asynchronously add additional TPs to the SFN. In addition, certain embodiments may optimize RF carrier phase alignment of any new TPs to the existing SFN without requiring a reset of the entire SFN to realign all of the TPs within the SFN. Thus, certain embodiments are directed to improvements in computer-related technology, specifically, providing for phase synchronization in a single frequency network.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

PARTIAL GLOSSARY

CCU Central Control Unit
DAS Distributed Antenna System
eNB Evolved Node B
GMC Grand Master Clock
IEEE Institute of Electrical and Electronics Engineers
ITU International Telecommunication Union
LTE Long-Term Evolution
MME Mobility Management Entity
QoS Quality of Service
RIBS Radio Interface Based Synchronization
RF Radio Frequency
SINR Single to Interference and Noise Ratio
SFN Single Frequency Network
SyncE Synchronized Ethernet
TP Transmission Point
ToP Timing over Packet
UE User Equipment

We claim:

1. An apparatus, comprising:
at least one processor; and
at least one memory including computer program code,
wherein the at least one memory and the computer program code are configured to, with the at least one processor, cause the apparatus to at least:
receive, by a device, one or more indications from one or more transmission points of a plurality of transmission points within a single frequency network,
wherein the received indications comprise one or both of one or more quality metrics and data from which to derive one or more quality metrics;
select, by the device, a transmission point from the plurality of transmission points based upon one or more of the quality metrics of one or more non-selected transmission points;
form, by the device, a cluster, wherein the cluster comprises the selected transmission point and at least one other transmission point from the plurality of transmission points; and communicate, by the device, an indication of the cluster to one or more of the selected transmission point and at least one other transmission point in the cluster,
wherein the indication of the cluster comprises one or more of information about the selected transmission point and information about one or more other transmission points from the plurality of transmission points.

2. The apparatus according to claim 1, wherein the at least one memory and the computer program code are further configured to, with the at least one processor, cause the apparatus to at least:
designate, by the device, a transmission point from among the plurality of transmission points;
obtain, by the device, one or more indications from one or more non-designated transmission points of the plurality of transmission points, wherein the one or more indications provide an indication of an in-band radio frequency reference signal received from the designated transmission point via one or more non-designated transmission points;
repeat the designate and obtain steps for one or more other transmission points of the plurality of transmission points, with one or more other transmission points in the plurality of transmission points being designated as the designated transmission point;
compare, by the device, quality metrics from one or more received indications; and
select, by the device, the transmission point corresponding to the quality metric indicating the highest quality.

3. The apparatus according to claim 1, wherein the one or more quality metrics comprise an indication of one or more of signal power, signal to interference and noise ratio, path loss, and channel rank.

4. The apparatus according to claim 1, wherein the data comprises data from which to derive an indication of one or more of signal power, signal to interference and noise ratio, path loss, and channel rank.

5. The apparatus according to claim 1, wherein the at least one memory and the computer program code are further configured to, with the at least one processor, cause the apparatus to at least:
connect, by the device, to one or more transmission points of the plurality of transmission points through a synchronized Ethernet;
designate, by the device, one or more of the transmission points of the plurality of transmission points as master transmission points;
designate, by the device, one or more non-master transmission points of the plurality of transmission points as slave transmission points;
form, by the device, one or more clusters, wherein a cluster comprises one or more master transmission points and one or more slave transmission points; and
communicate, by the device, one or more precision time protocol packets to the one or more master transmission points of the cluster.

6. The apparatus according to claim 1, wherein the at least one memory and the computer program code are further configured to, with the at least one processor, cause the apparatus to at least:
receive, by the device, phase synchronization data from a grand master clock; and
communicate, by the device, phase synchronization data to one or more transmission points.

7. The apparatus according to claim 5, wherein the received phase synchronization data is set as the reference phase for one or more transmission points of the plurality of transmission points within the respective cluster.

8. The apparatus according to claim 1, wherein the one or more quality metrics are derived from one or more of the received indications.

9. An apparatus, comprising:
at least one processor; and
at least one memory including computer program code,
wherein the at least one memory and the computer program code are configured to, with the at least one processor, cause the apparatus to at least:
transmit, by a transmission point of a plurality of transmission points within a single frequency network, one or more in-band radio frequency reference signals to one or more other transmission points of the plurality of transmission points;
receive, by the transmission point, one or more indications that the transmission point has been selected as a master transmission point, wherein the selection of the master transmission point is based on one or more quality metrics of one or more non-selected transmission points; and
receive, by the transmission point, one or more indications that the transmission point and one or more other transmission points of the plurality of transmission points are included in a cluster.

10. The apparatus according to claim 9, wherein the one or more quality metrics comprise an indication of at least one of signal power, signal to interference and noise ratio, path loss, and channel rank.

11. The apparatus according to claim 9, wherein the at least one memory and the computer program code are further configured to, with the at least one processor, cause the apparatus to at least:
connect, by the transmission point, to a device through a synchronized Ethernet;
receive, by the transmission point, an indication that the transmission point is designated;
transmit, by the transmission point, an in-band radio reference signal to one or more other transmission points in the plurality of transmission points;
receive, by the transmission point, an indication of a cluster comprising information of the transmission point and at least one other transmission point in the plurality of transmission points; and
receive, by the transmission point, precision time protocol packets.

12. The apparatus according to claim 9, wherein the at least one memory and the computer program code are further configured to, with the at least one processor, cause the apparatus to at least:
receive, by the transmission point, phase synchronization data from a grand master clock; and
transmit, by the transmission point, phase synchronization data to one or more other transmission points of the cluster through radio interface based synchronization.

13. The apparatus according to claim 12, wherein the acquired phase synchronization is set as the reference phase for one or more slave transmission points within the respective cluster to achieve phase synchronization in the single frequency network.

14. An apparatus, comprising:
at least one processor; and
at least one memory including computer program code,
wherein the at least one memory and the computer program code are configured to, with the at least one processor, cause the apparatus to at least:

receive, by a transmission point, one or more in-band radio frequency reference signals of one or more non-selected transmission points;

transmit, by the transmission point, data of the one or more in-band radio frequency reference signals; and receive, by the transmission point, one or more indications of a cluster comprising information of the transmission point and at least one other transmission point in a plurality of transmission points within a single frequency network.

15. The apparatus according to claim 14, wherein the in-band radio frequency reference signal is received from a designated transmission point.

16. The apparatus according to claim 14, wherein the received data of the in-band radio frequency reference signal includes one or more quality metrics.

17. The apparatus according to claim 16, wherein the one or more quality metrics comprise an indication of at least one of signal power, signal to interference and noise ratio, path loss, and channel rank.

18. The apparatus according to claim 14, wherein the indication of the cluster comprises information of one or more of a master transmission point and one or more slave transmission points.

19. The apparatus according to claim 14, wherein the at least one memory and the computer program code are further configured to, with the at least one processor, cause the apparatus to at least:

connect, by the transmission point, to a device through a synchronized Ethernet; and receive, by the transmission point, an indication that the transmission point is a slave transmission point.

20. The apparatus according to claim 18, wherein the at least one memory and the computer program code are further configured to, with the at least one processor, cause the apparatus to at least:

receive, by the transmission point, phase synchronization data from one or more transmission points in the cluster, wherein the phase synchronization data causes each master transmission point to become the reference phase over the radio interface based synchronization interface between the master transmission point and slave transmission points within the respective cluster with each slave transmission point adjusting phase through initial and/or periodic radio interface based synchronization based synchronization to the master transmission point within the respective cluster.

* * * * *